United States Patent [19]

Hehn et al.

[11] Patent Number: 4,643,301
[45] Date of Patent: Feb. 17, 1987

[54] BOOKLET POCKET FOR VIDEO CASSETTE STORAGE CONTAINERS

[75] Inventors: Bruce A. Hehn, Massillon; Donald E. McInnes, Louisville, both of Ohio

[73] Assignee: Alpha Enterprises, Inc., Canton, Ohio

[21] Appl. No.: 751,949

[22] Filed: Jul. 5, 1985

[51] Int. Cl.⁴ .................... B65D 71/00; B65D 85/672
[52] U.S. Cl. ...................................... 206/232; 40/312; 206/387
[58] Field of Search .................. 40/10 A, 10 D, 16.4, 40/10 R, 312, 313; 206/38, 232, 387, 459; 229/DIG. 4

[56] References Cited

U.S. PATENT DOCUMENTS

| 1,151,248 | 8/1915 | Dieges | 206/39.7 |
|---|---|---|---|
| 1,583,626 | 5/1926 | Swarts | 40/10 A |
| 3,553,851 | 1/1971 | Paige | 206/232 |
| 3,866,751 | 2/1975 | Holert | 206/387 |
| 3,876,071 | 4/1975 | Neal et al. | 206/387 |
| 3,907,193 | 9/1975 | Heller | 229/DIG. 4 |
| 4,011,940 | 3/1977 | Neal et al. | 206/387 |
| 4,105,112 | 8/1978 | Graf | 40/313 |
| 4,177,587 | 12/1979 | Dorsen et al. | 40/10 D |
| 4,184,594 | 1/1980 | Hehn | 206/387 |
| 4,255,872 | 3/1981 | William, Sr. | 206/232 |
| 4,301,608 | 11/1981 | Taylor, Jr. | 40/16.4 |
| 4,356,646 | 11/1982 | Johnson, Jr. | 40/16.4 |

FOREIGN PATENT DOCUMENTS 3013879 10/1981 Fed. Rep. of Germany ...... 206/387

Primary Examiner—William Price
Assistant Examiner—Jimmy G. Foster
Attorney, Agent, or Firm—Sand & Hudak Co.

[57] ABSTRACT

A panel formed by a generally flat plate with outwardly projecting flanges along three sides thereof is snap-fitted onto the bottom wall of a video cassette storage container and forms a pocket for holding a booklet or similar material. A plurality of inwardly projecting tabs formed on two of the panel flanges are engaged in notches formed in opposite side edges of the container bottom wall for removably mounting the panel on the container. A pair of clips are connected integrally by live hinges with the panel plate and project toward the bottom wall of the container for retaining a booklet within the pocket. The panel is molded of transparent plastic material and has ribs projecting from the outer surface of the panel to reduce scratching of the plate surface. A transparent plastic sheet also may be secured to the outer surface of the container top and end walls for holding a thin identification label therebetween.

14 Claims, 8 Drawing Figures

BOOKLET POCKET FOR VIDEO CASSETTE STORAGE CONTAINERS

TECHNICAL FIELD

The invention relates to containers and in particular to containers for storing video cassettes. More particularly, the invention relates to a storage container having a panel removably mounted on the bottom wall of the container which forms a pocket for removably holding a booklet or similar printed material.

BACKGROUND ART

The use of video cassettes together with associated equipment is growing in popularity. These cassettes are used primarily to record programs directly from a television for replay or else they are purchased with a program, movie or the like prerecorded thereon. It is desirable that these cassettes be shipped and stored in protective boxes or containers to prevent physical damage to the cassette during shipment as well as to keep the cassettes relatively dust free during storage.

One of the most common types of cassette container used today is an integrally molded rectangular-shaped plastic box of the type shown in U.S. Pat. Nos. 3,876,071; 4,011,940; and 4,184,594. These types of containers have a flat bottom wall surrounded on three sides by a pair of side walls and an end wall which forms an enclosure. A pair of spaced projections is formed on the bottom wall of the container and engage the hubs of a video cassette for retaining the cassette within the enclosure with the opposite wall being hingedly mounted to the bottom wall by an end wall which forms the hinge for completely enclosing the container upon latching of the top wall in a closed position opposite the bottom wall.

These cassette containers may have some type of clear plastic sheet attached to a portion of the outer surface of the bottom, top or end walls for receiving a label or other printed slip of paper therein to identify the contents of the cassette within the container.

Certain video cassettes are being sold in conjunction with printed material, usually in booklet form which complements the subject matter of the video cassette primarily for educational or instructional purposes and occassionally for entertainment purposes. Heretofore, there has been no means of keeping the booklet with the cassette since there is not enough space inside the cassette container for storage. Also, there is no means of securing the booklet to the exterior of the cassette or container. This results in the booklet becoming misplaced and possibly lost during shipment and storage and especially after purchase of the cassette and accompanying booklet by the ultimate end user. Also, it is desirable that when displaying the cassette in the container that a booklet if accompanying the cassette be visible to the customer, enabling the customer to readily realize that the booklet and cassette are sold as a unit or package and the contents thereof.

There is no video cassette storage container of which we are aware which provides a rugged dust proof construction molded of plastic which will store the cassette firmly and securely within the interior together with pocket means for receiving and displaying an accompanying booklet on the exterior of the container.

DISCLOSURE OF THE INVENTION

Objectives of the invention include providing an improved box-like video cassette storage container having a preferably removably mounted panel attached to the bottom wall of the container by a plurality of spaced tabs; in which the panel forms an elongated pocket in conjunction with the bottom wall of the container for receiving a booklet or similar material therein; and in which resilient clip means are molded integrally with and connected to the panel by live hinges and slope toward the container bottom wall for engaging a booklet inserted within the pocket to clamp the booklet therein.

A still further objective of the invention is to provide such an improved video cassette storage container in which the pocket forming panel is molded of transparent plastic and has a generally flat rectangular-shaped wall or plate with flanges extending perpendicularly therefrom around three sides of the panel wall for abutting engagement with the outer surface of the container bottom wall to space the panel wall therefrom and form the pocket therebetween, with the unflanged forth edge of the panel wall providing the opening into the pocket for insertion of a booklet; and in which upwardly projecting ribs are formed along the edges of the panel wall to protect the panel surface when the cassette is layed on a supporting member to reduce the scratching and marring of the transparent surface.

A still further objective of the invention is to provide such an improved cassette storage container in which the panel mounting tabs are engaged in complementary-shaped notches formed in the bottom wall of the container for snap-fitting the pocket forming panel in position on the container bottom wall. Another objective is to provide such a container in which a clear plastic film may cover the end wall and outer surface of the top wall or container lid for displaying a label therein. Still another objective is to provide such an improved container in which the pocket forming panel can be placed onto existing container configurations and requires little or no modifications thereto thereby eliminating expensive redesigning of existing containers and the mold cavities used for the plastic ejection molding thereof.

A still further objective is to provide such an improved video cassette storage container in which the pocket forming panel forms a relatively inexpensive, rugged device enabling relatively thick booklets of printed material to be securely yet releasably contained in the pocket whereby the booklet remains with the cassette at all times during transit and storage; and in which the booklet cover is readily visible through the clear plastic pocket forming material and the overall dimension and configuration of the storage container is relatively unchanged; and in which the pocket forming panels can be mass produced by usual injection molding plastic operations at a relatively small cost and readily assembled onto the container.

These objectives and advantages are achieved by the improved video cassette storage container of the invention the general nature of which may be stated as including a video cassette storage container of the type having spaced side, end, top and bottom walls forming a hollow enclosure with projections formed on an inside surface of either the top or bottom walls and projecting into the enclosure for engagement with spaced reel hub openings of a video cassette, wherein the improvement includes panel means mounted on an outside surface of the bottom wall for forming a pocket between said bottom wall surface and panel for removably holding a booklet therein.

DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
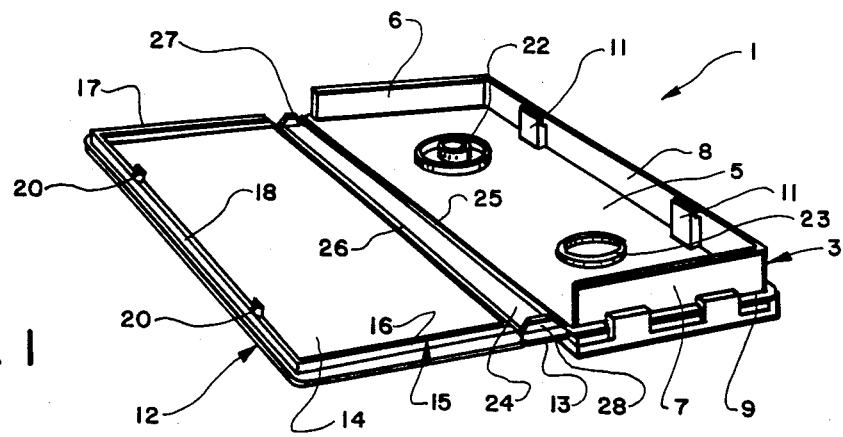
FIG. 1 is a perspective view of the improved video cassette storage container consisting of a usual container with the pocket forming panel being mounted thereon, and with the container being in an open position.
Figure 2:
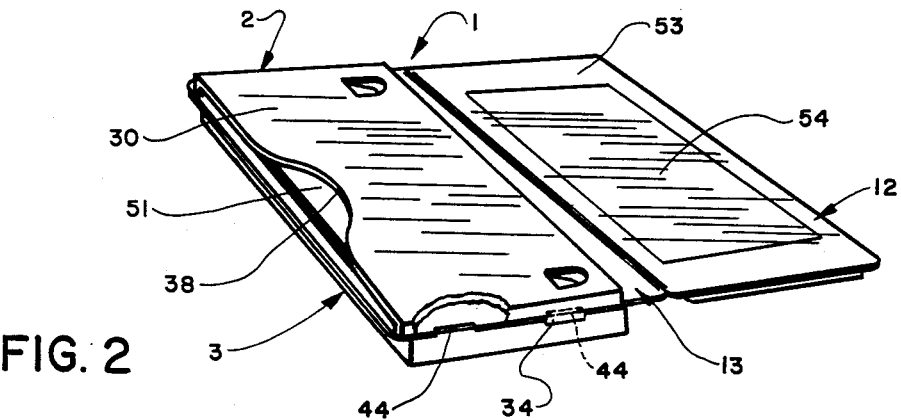
FIG. 2 is a bottom view of the improved storage container of FIG. 1 with the lid being shown in an open position and with portions of the pocket forming panel broken away.

The improved video cassette storage container is indicated generally at 1, and is shown particularly in FIGS. 1 and 2 and consists of a usual cassette storage container 3 having a booklet pocket forming panel indicated generally at 2, shown mounted thereon. Cassette storage container 3 is illustrated as being of the type as shown in U.S. Pat. No. 4,184,594. However, the particular container construction can vary without effecting the concept of the invention.

Storage container 3 is shown in FIG. 1 in an open position and has a rectangular box-like configuration and forms a hollow enclosure when enclosed and preferably is formed of a molded plastic material such as polypropylene. Container 3 includes a rectangular-shaped flat bottom wall 5 with upstanding parallel end walls 6 and 7 and a front wall 8. Walls 6, 7 and 8 are formed integrally with bottom wall 5 and are arranged in a U-shaped configuration to enclose three sides of the bottom wall. Walls 6-8 preferably are positioned inwardly a short distance from the outer edges of bottom wall 5 to form an outer exposed U-shaped ledge portion 9 extending between walls 6-8 and the outer edges of bottom wall 5. A pair of latching tab receiving members 11 are formed on the inner surface of front wall 8.

A flat rectangular shaped lid indicated generally at 12, is movably mounted on bottom wall 5 by a double-hinged end panel assembly indicated generally at 13. Lid 12 includes a top closure wall 14 similar in size and configuration to bottom wall 5. A U-shaped flange 15 is formed integrally with top wall 14 and projects outwardly from the inside surface thereof. Flange 15 includes a pair of parallel end portions 16 and 17 and an outer connecting front portion 18. Flange 15 is spaced a short distance inwardly from the outer edges of top wall 14 as are walls 6-8 of bottom wall 5.

A pair of spaced latching tabs 20 are formed on front portion 18 of flange 15 and are adapted to frictionally engage tab receiving members 11 to secure lid 12 in a closed position. Tabs 20 preferably are integrally molded with flange 15 of the same plastic material as the components described above. Hinge assembly 13 includes an elongated rectangular-shaped panel 24 formed of plastic material and is connected to the inner edges of bottom wall 5 and top wall 14 by hinges 25 and 26, referred to as "living" or "live" hinges. Hinges 25 and 26 are relatively thin flexible strips of plastic material molded integrally with panel 24 and bottom and top walls 5 and 14. A pair of upstanding transversely extending flanges 27 and 28 are molded integrally with the inner surface of panel 24 adjacent the outer ends thereof and are in alignment with flanges 16 and 17, respectively, of lid flange 15.

A pair of spaced reel hub receiving projections 22 and 23 are formed integrally on the inside surface of bottom wall 5 and extend therefrom for projection into a pair of spaced reel hub openings which are formed in each video cassette for securing a cassette in the container. Hub 22 may be formed by a pair of concentric annular projections as shown in FIG. 1, with projection 23 having an oval shaped configuration such as shown and described in U.S. Pat. No. 4,184,594. If desired, projection 23 may be similar to projection 22 without effecting the concepts of the invention. Likewise, projections 22 and 23 could have a configuration similar to that shown in U.S. Pat. No. 3,876,071.

The above discussion describes briefly one form of cassette storage container 3 which is shown in the drawings on which the pocket forming panel 2 may be mounted to form improved video cassette storage container 1.

Figure 8:
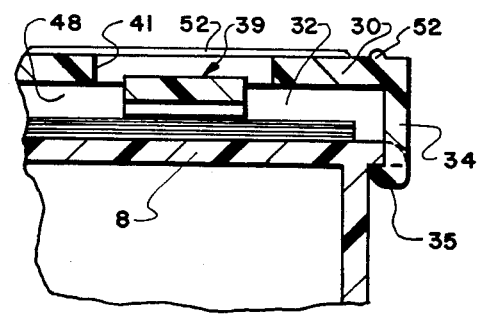
FIG. 8 is a greatly enlarged fragmentary sectional view taken on line 8—8, FIG. 4.

In accordance with one of the main features of the invention, pocket forming panel 2 (FIG. 3) is adapted to be removably mounted on storage container 3 as described below. Panel 2 is a one-piece plastic molded member preferably formed of a transparent type of plastic material. Panel 2 includes a generally flat rectangular-shaped wall or plate 30 surrounded on three sides by flanges 31, 32 and 33 which extend perpendicularly downwardly therefrom. Wall 30 as well as flanges 31-33 are formed of relatively stiff plastic material. A pair of lugs 34 are formed integrally on panel flanges 31 and 33 and terminate in inwardly extending tabs 35 (FIG. 8). The outer edge 37 of panel wall 30 is formed with a concave recess 38 or other configuration.

Figure 3:
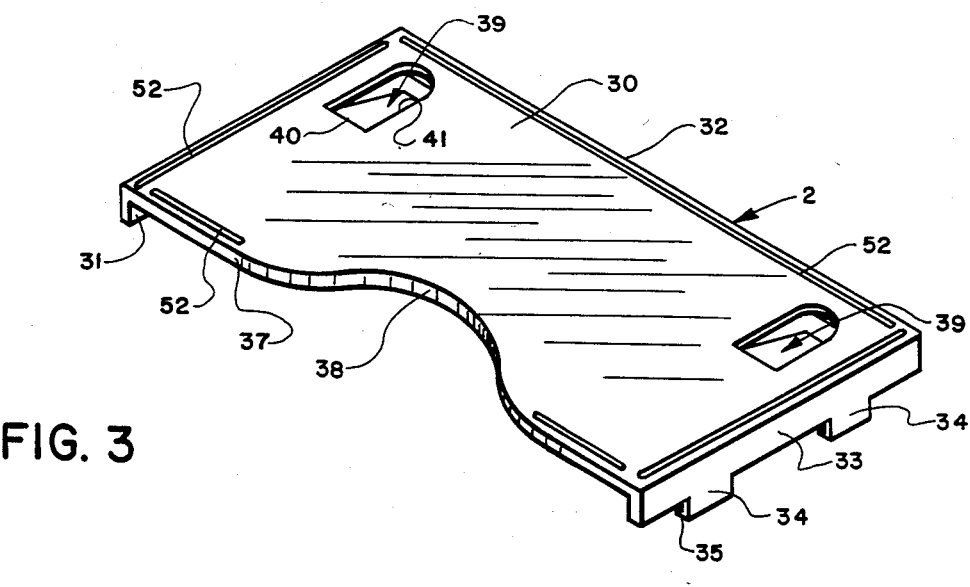
FIG. 3 is an enlarged perspective view of the pocket forming panel removed from the storage container of FIGS. 1 and 2.
Figure 4:
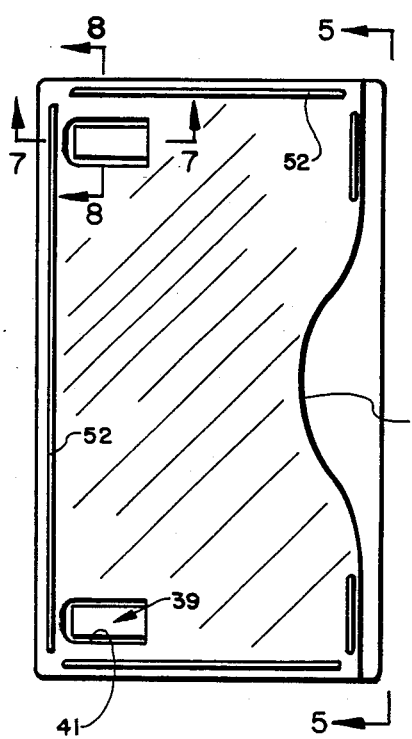
FIG. 4 is a bottom plan view of the storage container of FIG. 1 with the pocket forming panel mounted thereon and with the container being shown in the closed position.
Figure 5:
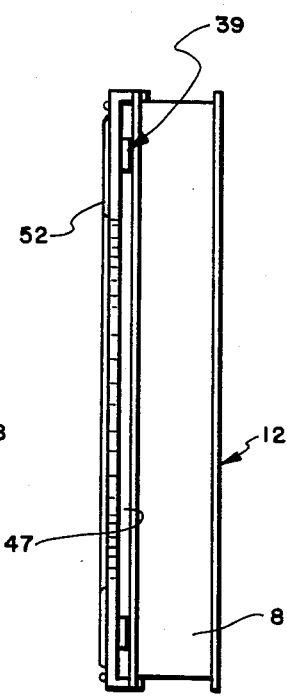
FIG. 5 is an end elevational view looking in the direction of arrows 5—5, FIG. 4.
Figure 6:
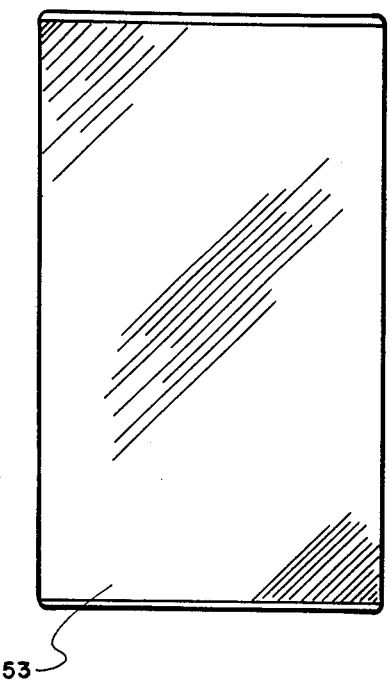
FIG. 6 is a top plan view of the container of FIG. 1 in a closed position.
Figure 7:
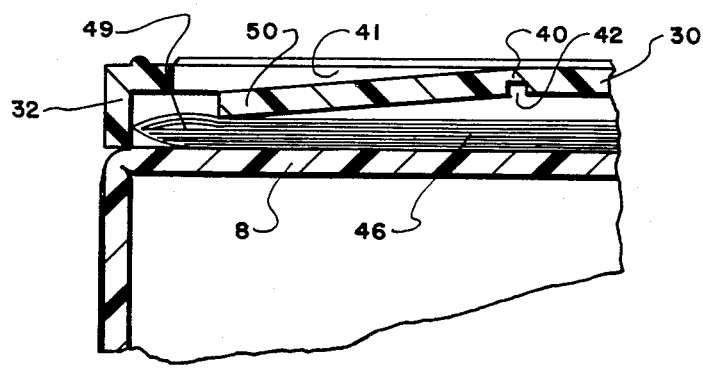
FIG. 7 is a greatly enlarged fragmentary sectional view taken on line 7—7, FIG. 4.

A pair of clips indicated generally at 39, is formed integrally with panel wall 30 by a live hinge strip 40 (FIGS. 3, 4 and 7). Clips 39 are located within cutouts 41 formed in wall 30 which provide the material for the formation of clips 39 during the injection molding thereof. Clips 39 preferably have the same material thickness as wall 30 and hinge strips 40 may have a reduced thickness by the formation of a groove 42 at the junction of the clips with the material of wall 30 to provide live hinge action (FIG. 7). If desired clips 40 may be formed of a softer plastic material than that of wall 30 eliminating the need for groove 42 to provide the desired flexibility for the hinge.

A pair of spaced notches 44 are formed in opposite sides of bottom wall ledge 9 adjacent walls 6 and 7 for engagement with lug tabs 35 (FIG. 8) to snap-fit pocket 2 onto bottom wall 5. The engagement of tabs 35 within notches 44 retains panel 2 in its mounted position on bottom wall 5 preventing any sliding movement therebetween and also permits container 1 to stand on edge without falling since the lugs will be flush with the edges of bottom wall 5.

In accordance with one of the main features of the invention, a booklet 46 (FIGS. 2, 7 and 8) is slid through pocket opening 47 and into pocket interior 48 with the forward end 49 of the booklet passing beyond tips 50 of clips 39. Due to the molding of clips 39 in an angled direction toward bottom wall 5 as shown in FIGS. 3 and 7, it provides a biasing force downwardly toward bottom wall 5 to clamp book end 49 against wall 5 preventing its accidental sliding movement from within the pocket. Preferably clips 39 engage bottom wall 5 to provide a sufficient biasing force for holding very thin booklets which may be inserted within the pocket. The booklet is removed easily from pocket 2 by an individual requiring only a relatively small amount of force exerted on an outer exposed portion 51 of book 46 due to concave recess 38 in panel wall edge 37.

A thin sheet of plastic film 53 preferably is attached along its edges by a heat seal or an adhesive onto the outer surface of lid 12 and end panel assembly 13. The film is open at an upper end thereof for receiving a label 54 between the film and the lid and end panel. The label contains printing to indicate the contents of the cassette stored within the container. Likewise, the transparency of pocket forming panel wall 30 enables the cover of booklet 46 to be readily seen and read while the book is stored within pocket interior 48.

Although pocket forming panel 2 is shown as being removably mounted on and attached to end wall 5 of storage container 3, panel 2 could be attached to lid 12 and form a pocket therebetween. However, attachment to bottom wall 5 is preferred since the bottom wall 5 is stiffer than lid 12 due to the larger enclosing end walls 6, 7 and 8. Panel 2 could be mounted on both end walls 5 and on lid 12 to receive two booklets 46 is desired for certain applications.

Pocket panel 2 could be attached to bottom wall 5 by an adhesive, heat seal or other attachment means than by lugs 34 and could be molded integrally therewith. However, it is believed that the snap-fit engagement provided by lugs 34 and 35 provides the most efficient means of attachment of panel 2 on storage container 3. This enables panel 2 to be molded separate and apart from the storage container thereby reducing production costs.

Accordingly, improved cassette storage container 1 formed by pocket forming panel 2 and a usual type of storage container 3 provides an extremely durable and rugged construction enabing a video cassette to be stored in a usual manner within the container enclosure, and in addition provides a storage compartment for a booklet which accompanies the cassette to enable the booklet to remain with the cassette during shipment, storage and usage reducing the possibility of the booklet becoming lost or misplaced.

Furthermore, the improved storage container requires only a modest increase in price over a usual storage container due to the relatively low cost of the molding of storage panel 2 which is easily attached to the container. Also, only the formation of notches 44 in the bottom wall ledges of container 3 is required for securing pocket 2 thereon. Although notches 44 are preferred, they are not essential since lug tabs 35 could adequately mount the pocket on the container without such notches. Also, the pocket 2 once snap-fitted into position on bottom wall 5 can be removed if desired without damaging the container or panel and can be reused on the same panel or another container.

A plurality of elongated projections or ribs 52 are formed integrally on the outer surface of panel wall 30 (FIGS. 3 and 8) and extend generally about the periphery of wall 30. Ribs 52 reduce the marring and scratching of the wall surface by generally supporting the container when it is layed on a surface or placed in abutment with another object.

Accordingly, the improved video cassette storage container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, cleanness and understanding; but no unnecessary limitations are to be implied therefrom beyond the requirements of the prior art, because such terms are used for descriptive purposes and are intended to be broadly construed.

Moreover the description and illustration of the invention is by way of example, and the scope of the invention is not limited to the exact details shown or described.

Having now described the features, discoveries, and principles of the invention, the manner in which the improved video cassette storage container is constructed and used, the charactistics of the construction, and the advantageous, new and useful results obtained; the new and useful structures, devices, elements, arrangements, parts, and combination, are set forth in the appended claims.

What is claimed is:

1. An improved video cassette storage container having spaced side, end, top and bottom walls forming a hollow enclosure with projections formed on an inside surface of either the top or bottom walls and projecting into the enclosure for engagement with spaced reel hub openings of a video cassette, wherein the improvement includes panel means mounted on an outside surface of the bottom wall for forming a pocket with said bottom wall surface for removably holding a booklet therein; said panel means being formed of a relatively stiff plastic material and having a panel wall with flanges formed integrally therewith and extending from three sides of said panel wall and having a continuous open forth side; and means for mounting the panel wall in a fixed position on the bottom wall of the container and in a spaced relationship from said bottom wall to form the pocket therebetween with the open forth side of the panel means providing access into said pocket means, said mounting means including a plurality of lugs extending between and engaged with the panel means and bottom wall of the storage container.

2. An improved video cassette storage container having spaced side, end, top and bottom walls forming a hollow enclosure with projections formed on an inside surface of either the top or bottom walls and projecting into the enclosure for engagement with spaced reel hub openings of a video cassette, wherein the improvement includes panel means mounted on an outisde surface of the bottom wall for forming a pocket with said bottom wall surface for removably holding a booklet therein; said panel means being formed of a relatively stiff plastic material and having a panel wall with flanges formed integrally therewith and extending from three sides of said panel wall and having a continuous open forth side; and means for mounting the panel wall in a fixed position on the bottom wall of the container and in a spaced relationship from said bottom wall to form the pocket therebetween with the open forth side of the panel means providing access into said pocket means, said mounting means including a plurality of lugs formed on certain of the panel wall flanges.

3. The storage container defined in claim 2 in which the panel means is a one piece member with the panel wall having a flat relatively rectangular configuration; and in which the flanges extend generally perpendicular from said three side of the panel wall.

4. The storage container defined in claim 3 in which clips are formed on the panel wall and extend into the pocket toward the bottom wall of the container for releasably retaining a booklet inserted into the pocket.

5. The storage container defined in claim 4 in which the clips are connected integrally with the panel wall by live hinges; and in which the clips are sloped toward the bottom wall of the container.

6. The storage container defined in claim 5 in which the hinges are strips of material integrally joining the clips to the panel wall; and in which the hinges have a thickness less than the thickness of the clips and panel wall.

7. The storage container defined in claim 2 in which the lugs include a pair of spaced lugs formed on two of the panel flanges and positioned opposite of each other; and in which tabs are formed on the lugs and are located within notches formed in the bottom wall of the container.

8. The storage container defined in claim 2 in which the panel wall has an outer surface; and in which ribs are formed along edge portions of the panel wall outer surface and project outwardly therefrom for supporting the panel wall when the container is placed on a surface to reduce scratching of said panel wall outer surface.

9. The storage container defined in claim 2 in which opposite side edges of the bottom wall of the container extend beyond the container sidewalls; and in which notches are formed in said opposite side edges for receiving tha panel lugs for removably mounting the panel means on said bottom wall.

10. The storage container defined in claim 2 in which the fourth side of the panel is formed with a concave recess.

11. The storage container defined in claim 2 in which the panel means is formed of a transparent plastic material.

12. An improved video cassette storage container having spaced side, end, top and bottom walls forming a hollow enclosure with projections formed on an inside surface of either the top or bottom walls and projecting into the enclosure for engagement with spaced reel hub openings of a video cassette, wherein the improvement includes panel means mounted on an outside surface of the wall for forming a pocket with said bottom wall surface for removably holding a booklet therein; said panel means being a one piece member formed of a relatively stiff plastic material and having a flat relatively rectangular panel wall with flanges formed integrally therewith and extending generally perpendicularly from three sides of said panel wall; a pair of spaced lugs formed integrally on two of the panel flanges and positioned opposite of each other, said lugs releasably engaging the bottom wall of the container removably mounting the panel means on said container and spacing the panel wall therefrom to form the pocket; and tabs formed on the lugs and located within notches formed in the bottom wall of the container for mounting the panel wall on the bottom wall of the container.

13. An improved video cassette storage container having spaced side, end, top and bottom walls forming a hollow enclosure with projections formed on an inside surface of either the top or bottom walls and projecting into the enclosure for engagement with spaced reel hub openings of a video cassette, wherein the improvement includes panel means mounted on an outside surface of the bottom wall for forming a pocket with said bottom wall surface for removably holding a booklet therein; said panel means being a one piece member formed of a relatively stiff plastic material and having a flat relatively rectangular configuration with an outer surface and with flanges formed integrally therewith and extending generally perpendicularly from three sides of said panel wall and engaged with the bottom wall of the container to locate the panel wall in a spaced relationship from the bottom wall of the container; and rib means formed along edge portions of the panel wall outer surface and projecting outwardly therefrom for supporting the panel wall when the container is placed on a surface to reduce scratching of said panel wall outer surface.

14. An improved video cassette storage container having spaced side, end, top and bottom walls forming a hollow enclosure with projections formed on an inside surface of either the top or bottom walls and projecting into the enclosure for engagement with spaced reel hub openings of a video cassette, with said bottom wall having opposite side edges extending beyond the container sidewalls; wherein the improvement includes panel means mounted on an outside surface of the bottom wall for forming a pocket with said bottom wall surface for removably holding a booklet therein; said panel means being formed of a relatively stiff plastic material and having a panel wall with flanges formed integrally therewith and extending from certain sides of said panel wall; a plurality of lugs formed on the panel wall flanges; and notches formed in the opposite side edges of the bottom wall receiving the lugs therein for removably mounting the panel means in a spaced relationship on said bottom wall.

* * * * *